United States Patent [19]

Kurahashi et al.

[11] Patent Number: 4,733,095
[45] Date of Patent: Mar. 22, 1988

[54] METHOD AND DEVICE FOR DETECTING AVERAGE LIQUID LEVEL IN A BOTTLE

[75] Inventors: Michito Kurahashi, Osaka; Hisao Tomikawa, Kagamigahara; Yuji Doi, Takatsuki, all of Japan

[73] Assignee: Suntory Limited, Osaka, Japan

[21] Appl. No.: 933,987

[22] Filed: Nov. 24, 1986

[30] Foreign Application Priority Data

Nov. 28, 1985 [JP]  Japan .................................. 60-268178

[51] Int. Cl.$^4$ ............................................ G01N 15/06
[52] U.S. Cl. ....................................... 250/577; 340/619; 73/293
[58] Field of Search ................... 250/577, 575, 223 R; 340/619; 73/293

[56] References Cited

U.S. PATENT DOCUMENTS 3,094,213  6/1983  Wyman .
3,452,208  6/1969  Giltinan .
4,246,489  1/1981  Yoshida et al. ..................... 250/577
4,672,216  6/1987  Pitt et al. ............................. 250/575

FOREIGN PATENT DOCUMENTS 061797    10/1982  European Pat. Off. .
3416178   11/1985  Fed. Rep. of Germany .
60-200126 10/1985  Japan .

Primary Examiner—Edward P. Westin
Assistant Examiner—Jessica L. Ruoff
Attorney, Agent, or Firm—Bachman & LaPointe

[57] ABSTRACT

A method for detecting a liquid level is monitored at mutually opposing sides of a liquid containing bottle. For monitoring the liquid level at each side of the bottle, a diffused light beam is irradiated toward the liquid surface from a level below the liquid surface. The light reflected at the liquid surface and the light refracted at the liquid surface are detected by a photo-receiving camera which is focused at a standard liquid level. An average value of the monitored liquid levels at both sides is taken as a liquid level indicative value. By employing the aforemention method, accurate detection of the liquid level becomes possible even when the liquid level is unstable.

14 Claims, 7 Drawing Figures

LOWER FRAME LEVEL

METHOD AND DEVICE FOR DETECTING AVERAGE LIQUID LEVEL IN A BOTTLE

BACKGROUND OF THE INVENTION

1. Field of the Invention

The present invention relates generally to a method and device for detecting a liquid level. More specifically, the invention relates to means for detection of liquid level of a liquid contained in a transparent or semi-transparent container, such as bottle.

2. Description of the Background Art

In general, in bottling of alcohols, drinks, sauces, liquid spices, it has been required to adjust the bottling amount within a predetermined range of amount. Usually, the bottling amount is controlled by controlling the liquid level in the bottle. Therefore, liquid level in the bottle has to be detected for enabling control of the bottling amount.

In one of conventional method a light source is provided at one side of a bottle at a level approximately corresponding to the desired liquid level, and a photo-receiver camera at the opposite side to and the corresponding level to the light source. The light beam is horizontally projected from the light source toward the photo-receiver camera. The photo-receiver camera receives the light beam through the bottle. The intensity of the received light beam is converted into electric voltage by means of a photoelectric transducer. This method is based on difference of light transmission factor between the bottle section containing the liquid and empty bottle section. However the border between the liquid containing section and the empty section to be detected, may become rather vague. Therefore, with such conventional device, precise detection of the liquid level cannot be performed.

In order to eliminate or reduce this drawback in the conventional process, a method and device for detecting the liquid level has been proposed, in the Japanese Patent First Publication (Tokkai). Showa No. 60-200126, published on Oct. 9, 1985. The disclosed device has a light source provided at the level below the liquid level. The light source is designed to project a diffused light beam toward the liquid surface. The photo-receiver camera is placed at a level corresponding to the standard liquid level. The photo-receiver camera is focused at the bottle surface approximately corresponding to the standard liquid level. The light beams passing through the liquid and bottle is received by the photo-receiver camera. The intensity of light beam received by the photo-receiver camera becomes high at the position of liquid level because of presence of a light beam component reflected at the rising circumferential section of the liquid surface. Therefore, output of the photelectric transducer becomes higher at the liquid level than remaining sections.

In the prior proposed system, a difficulty has arisen when the liquid is oscillating or waving. This possibly occurs during transportation through conveying system in automatic bottling processes. If the liquid is oscillating or waving, the liquid surface becomes unstable and can lead to mis-detection of the liquid level.

SUMMARY OF THE INVENTION

Therefore, it is a principle object of the present invention to provide an improved method and device for detecting the liquid level, which does not require precision adjustment of the light source angle as that required in the prior proposed method and device set forth above.

Another object of the invention is to provide an improved method and device for detecting the liquid level in a bottle, which detects a light beam twice refracted at the liquid surface.

In order to accomplish the aforementioned and other objects, in a method for detecting a liquid level, according to the invention, liquid level is monitored at mutual opposing sides of a liquid containing bottle. For monitoring the liquid level at each side of the bottle, a diffused light beam is irradiated toward the liquid surface from the level below the liquid surface. The light reflected at the liquid surface and the light refracted at the liquid surface are detected by a photo-receiving camera which is focused at a standard liquid level. An average value of the monitored liquid levels at both sides is taken as a liquid level indicative value.

By employing the aforemention method, accurate detection of the liquid level becomes possible even when the liquid level is unstable.

According to one aspect of the invention, a method for detecting a liquid level in a bottle comprises the steps of:

irradiating first light beam toward an area of liquid surface adjacent the peripheral bottle wall at a first side of the bottle from a position below the liquid surface and located at a second side of the bottle opposite to the first side;

irradiating second light beam toward an area of liquid surface adjacent the peripheral bottle wall at the second side of the bottle from a position below the liquid surface and located at the first side of the bottle;

receiving a first horizontally directed component of the first light beam reflected from the liquid surface and a second horizontally directed component of the first light beam refracted through the liquid, at the first side;

producing a first light intensity indicative signal having higher values at signal positions corresponding to elevations, at which the first and second horizontally directed components of the first light beam are received;

receiving a third horizontally directed component of the second light beam reflected at the liquid surface and a fourth horizontally directed component of the second light beam refracted through the liquid, at the second side;

producing a second light intensity indicative signal having higher values at signal positions corresponding to elevations, at which the third and fourth horizontally directed components of the second light beam are received;

processing the first and second intensity indicative signals for deriving average signal position to derive an average liquid level.

The method further comprises the steps of:

providing a first camera at the first side of the bottle for receiving the first and second horizontally directed components of the first light beam and for producing the first light intensity indicative signal, at a elevation corresponding to a predetermined standard liquid level;

providing a second camera at the second side of the bottle for receiving the third and fourth horizontally directed components of the second light beam and for producing the second light intensity indicative signal, at a elevation corresponding to a predetermined standard liquid level; and focusing the first and second cameras at the positions on the bottle surface corresponding to the predetermined liquid level.

A further object of the present invention is to provide a device for implementing the aforementioned liquid level detecting method according to the invention.

According to the present invention, a liquid level detecting device has two pairs of light sources and photo-receiving cameras focused at a standard liquid level. One of the light sources is placed at a first side of the liquid containing bottle and the associated photo-receiving camera is placed at second side opposite to the first side. On the other hand, the other camera is placed at the second side and the other photo-receiving camera is placed at the first side. The light sources are so designed as to irradiate diffused light beam toward the liquid surface at their respective opposite sides. The light beam irradiated from the light source is reflected at the rising circumferential section of the liquid surface and refracted at the liquid surface. The photo-receiving cameras receive both the reflected light and refracted light. Based on the output from the photo-receiving cameras, light level at each side is derived. Then an average value of the derived liquid level is derived as a light level indicative value.

According to another aspect of the invention, a device for detecting a liquid level in a bottle comprises first means for irradiating first light beam toward an area of liquid surface adjacent the peripheral bottle wall at a first side of the bottle from a position below the liquid surface and located at a second side of the bottle opposite to the first side, second means for irradiating second light beam toward an area of liquid surface adjacent the peripheral bottle wall at the second side of the bottle from a position below the liquid surface and located at the first side of the bottle, third means for receiving a first horizontally directed component of the first light beam reflected at the liquid surface and a second horizontally directed component of the first light beam refracted through the liquid, at the first side, fourth means for producing a first light intensity indicative signal having higher values at signal positions corresponding to elevations, at which the first and second horizontally directed components of the first light beam are received, fifth means for receiving a third horizontally directed component of the second light beam reflected at the liquid surface and a fourth horizontally directed component of the second light beam refracted through the liquid, at the second side, sixth means for producing a second light intensity indicative signal having higher values at signal positions corresponding to elevations, at which the third and fourth horizontally directed components of the second light beam are received, and seventh means for processing the first and second intensity indicative signals for deriving average signal position to derive an average liquid level.

The device may further comprise eighth means for providing a first camera at the first side of the bottle for receiving the first and second horizontally directed components of the first light beam and for producing the first light intensity indicative signal, at a elevation corresponding to a predetermined standard liquid level, ninth means for providing a second camera at the second side of the bottle for receiving the third and fourth horizontally directed components of the second light beam and for producing the second light intensity indicative signal, at a elevation corresponding to a predetermined standard liquid level, and tenth means for focusing the first and second cameras at the positions bottle surface corresponding to the predetermined liquid level. The first and third horizontally directed components of the first and second light beams are reflected at circumferentially extending rising portion of the liquid surface in horizontal direction, and the second and fourth horizontally directed components of the first and second light beams are twice refracted at the general surface of the liquid and at a surface of a circumferentially extending rising position to be directed horizontally.

In the preferred process, the seventh means derives the average liquid level obtaining average signal position of the signal positions corresponding to the elevations of the first and third horizontally directed components of the first and second light beams. In the alternative, the seventh means derives the average liquid level by obtaining average signal position of the signal positions corresponding to the elevations of the second and fourth horizontally directed components of the first and second light beams. In the further alternative, the seventh means derives average liquid level obtaining average signal position of the signal positions corresponding to the elevations of the first, second, third and fourth horizontally directed components of the first and second light beams.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
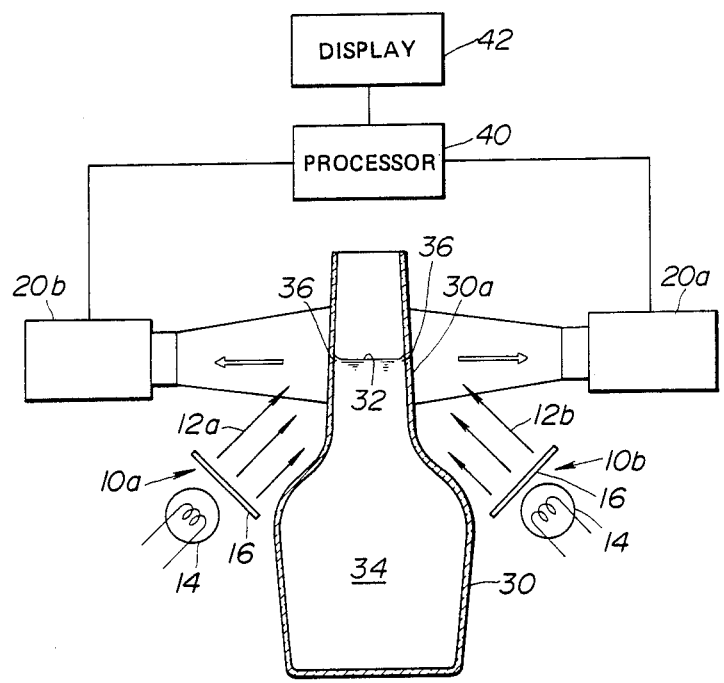
FIG. 1 is a fragmentary illustration of the preferred embodiment of a liquid level detecting system according to the present invention.
Figure 2:
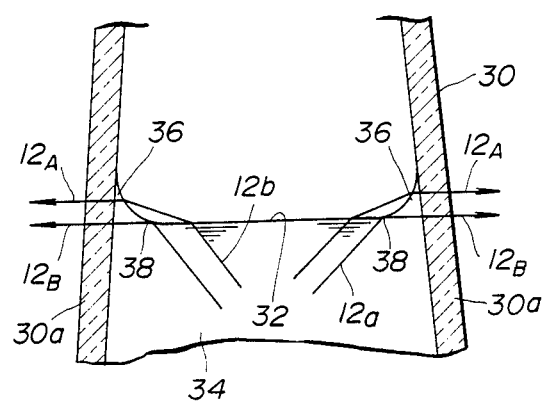
FIG. 2 is an enlarged section showing a part of a bottle, about which the liquid level is detected by means of the preferred embodiment of the liquid level detecting system of FIG. 1.

Referring now to the drawings, particularly to FIGS. 1 and 2, the preferred embodiment of a liquid level detecting system, according to the present invention, generally comprises light source assemblies 10a and 10b, and photo-receiving camera assemblies 20a and 20b. The light source assembly 10a and the photo-receiving camera assembly 20a are arranged opposite sides of a conveying path (not shown) through which liquid containing bottles 30 are fed. The light source assembly 10b is arranged on the opposite side from the light source assembly 10a and also on the opposite side from the photo-receiving camera assembly 20b. As will be seen from FIG. 1, the light source assemblies 10a and 10b are arranged at lower level than a liquid level 32 of a liquid 34 contained in the bottle 30. The light source assemblies 10a and 10b are so designed as to emit diffused light beams 12a and 12b toward the possible liquid surface 32 adjacent respectively peripheral bottle wall 30a of opposite sides. Therefore, the diffused light beams 12a and 12b emitted from the light source assemblies 10a and 10b are irradiated onto the liquid surface at an oblique angle to thereto. The angle of each of the light source assemblies 10a and 10b is selected so that a first component 12A of the light beams 12b and 12a pass through the liquid 34 and is refracted at the liquid surface. The refracted light beam 12A is again refracted by the surface of the circumferential rising portion 36 of the liquid to be horizontally projected through the bottle 30. The angle of each of the light source assemblies 10a and 10b is further determined so that a second component, light beam 12B, is reflected at the adjoining section 38 between the central general surface and the circumferential rising portion 36. The second component 12B of the light beam 12 is horizontally projected through the bottle 30.

Each of the light source assemblies 10a and 10b comprises a light source 14 and a diffusion plate 16. The light source 14 comprises a high-power halogen lamp, high-frequency fluorescent light lamp or laser. When a halogen lamp or fluorescent light lamp is used as the light source 14, diffused light is emitted from the light source. In which case, the diffusion plate 16 is selected to deflect the diffused light from the light source and to direct the light beam 12a and 12b toward the liquid surface 32 adjacent the peripheral bottle wall 30a on the opposite side of the bottle. On the other hand, when the laser is used as the light source 14, the diffusion plate 16 may serve as a diffusion medium for forming the diffused light beam directed to the liquid surface 32.

Though the shown embodiment employs the diffusion plate for forming the diffused light beam, the diffusion plate is not always necessary for forming the diffused light beam. Especially, when diffused light source, such as halogen lamp, fluorescent light lamp and so forth, is employed as the light source, the diffusion plate is practically unnecessary.

Though the light source assemblies 10a and 10b are provided at a lower level than the liquid level in the bottle, it would be possible to form the diffused light beams 12a and 12b irradiated from the underside of the liquid surface in formed various ways. For instance, the light source assemblies 10a and 10b may be placed at any vertical level irrespective of the liquid level. In which case, reflectors may be placed below the liquid level to reflect the light beams 12a and 12b from the light source assembly toward the liquid surface.

Figure 3:
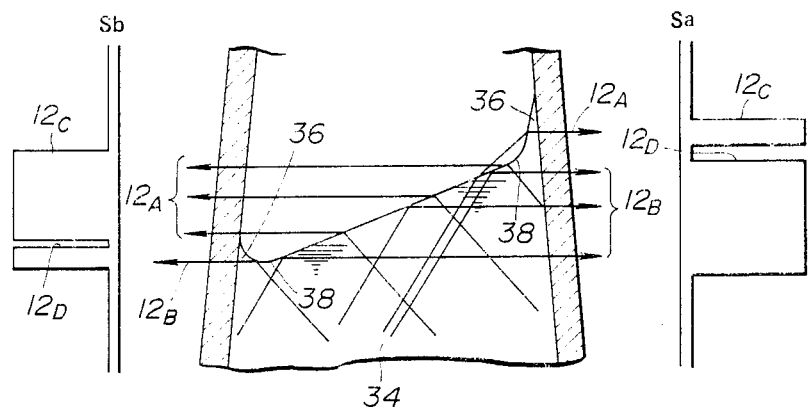
FIG. 3 is an enlarged section of a part of a bottle, about which the liquid level is detected by means of the the preferred embodiment of the liquid level detecting system of FIG. 1, in which the condition of the liquid surface is unstable.

The photo-receiving camera assemblies 20a and 20b may comprise a photo-receiving camera or any other light image pick-up device. The photo-receiving camera assemblies 20a and 20b are placed at a level corresponding to a predetermined standard liquid level. The photo-receiving camera assemblies 20a and 20b are respectively focused at points around the liquid containing bottle surface approximately corresponding to the standard liquid level for providing a given image pick-up range covering the possible projecting regions of the aforementioned first and second components 12A and 12B of the light beam. The photo-receiving camera assemblies 20a and 20b produce sensor signals Sa and Sb respectively having values indicative of the intensity of the light beam received at each elevation, as shown in FIG. 3. As will be appreciated from FIG. 3, the sensor signal value increases in an elevation range where the first and second components 12A and 12B of the light beams 12a and 12b are received. Therefore, the HIGH level range of the sensor signals Sa and Sb generally represents the range of the rising portion 36 of the circumferential section of the liquid surface. Namely, the rising edge 12C of the HIGH level sensor signals Sa and Sb essentially represent the upper end of the rising portion 36 and the rising edge 12D of the sensor signals Sa and Sb essentially represents the liquid surface level 32 at the general portion.

The sensor signals Sa and Sb are fed to a signal processor 40 which processes the sensor signals to detect the positions of the rising edges 12C and 12D of the sensor signals to detect the elevation range where the first and second components 12A and 12B are received. In the signal processing, the sensor signals Sa and Sb may be compared with a predetermined threshold value $S_{ref}$ to avoid environmental noise component to be superimposed on the sensor signals Sa and Sb.

The signal processor 40 has per se well known construction for processing the sensor signals. The signal processor 40 derives a liquid level indicative signal indicative of the elevation of the rising edges 12C and 12D of the sensor signals Sa and Sb. An average value of the liquid level indicative signal values at the rising edges 12C and 12D derived with respect to each of the sensor signals Sa and Sb is obtained.

Figure 4:
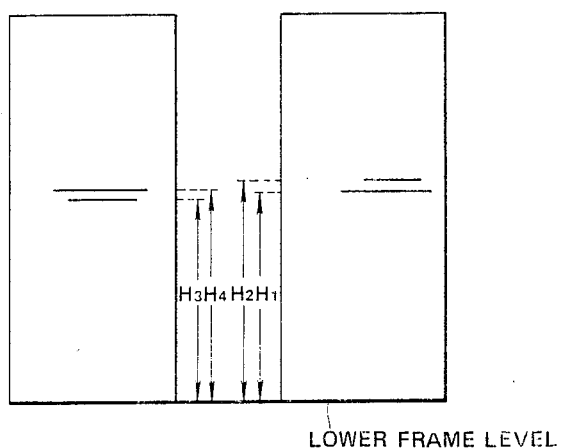
FIG. 4 is an explanatory illustration showing an image picked up by the photodetectors in the modified embodiment of the liquid level detecting system of FIG. 1, in the condition of FIG. 3.

FIG. 4 shows the elevations of the rising edges 12C and 12D of respective sensor signals Sa and Sb. Assuming respective heights of the rising edges 12C and 12D of the sensor signals Sa and Sb, from the lower frame level of the view-field of the photo-receiving cameras 20a and 20b, are $H_1$, $H_2$, $H_3$ and $H_4$, the average value may be derived in the following manner.

When the waving or oscillation of the liquid is relatively small and thus the liquid surface is rather stable, the average value $H_{ave}$ may be obtained by averaging the $H_1$ and $H_3$ values respectively representative of the elevation of the lower rising edges 12D of the sensor signals Sa and Sb. In the alternative, the average value of the $H_2$ and $H_4$ values is respectively representative of elevations of the higher rising edge 12C of the sensor signals Sa and Sb may be used for indicating the liquid level.

On the other hand, when the waving or oscillation of the liquid in the bottle is substantial the high intensity range becomes wider than that obtained in the stable liquid surface condition, as shown in FIG. 3. Therefore, the liquid level elevation is assumed as the intermediate position between the $H_1$ and $H_2$ and $H_3$ and $H_4$. Therefore, the average value $H_{ave}$ may be derived from the following equation:

$$H_{ave} = (H_1 + H_2 + H_3 + H_4)/4$$

Experimental measurement has been performed for confirming accuracy of detection of the liquid level in various liquid waving conditions. In order to perform the experimentation, a liquid is disposed in a bottle up to the height of 45.3 mm. At stable condition, measured heights $H_1$, $H_2$, $H_3$ and $H_4$ are respectively 43.8, 46.3, 44.3 and 46.6. Consequently, the average value $H_{ave}$ becomes 45.3. An experimental measurement has been conducted with respect to samples No. 1 through No. 29. The result is shown in the following table.

TABLE

| Sample | $H_1$ | $H_2$ | $H_3$ | $H_4$ | (mm) AVERAGE VALUE |
|---|---|---|---|---|---|
| 1 | 42.9 | 45.5 | 45.9 | 48.2 | 45.6 |
| 2 | 42.9 | 45.8 | 45.9 | 47.8 | 45.6 |
| 3 | 43.5 | 45.2 | 45.7 | 48.4 | 45.7 |
| 4 | 43.4 | 46.3 | 45.2 | 46.8 | 43.4 |
| 5 | 43.3 | 46.2 | 45.1 | 46.1 | 45.2 |
| 6 | 42.6 | 45.1 | 46.0 | 47.1 | 45.2 |
| 7 | 43.2 | 45.4 | 44.0 | 47.2 | 45.0 |
| 8 | 44.0 | 45.7 | 45.0 | 48.0 | 45.7 |
| 9 | 44.0 | 45.4 | 44.7 | 48.5 | 45.7 |
| 10 | 43.5 | 45.7 | 45.0 | 48.4 | 45.7 |
| 11 | 43.6 | 46.5 | 45.0 | 46.8 | 45.5 |
| 12 | 45.2 | 46.2 | 42.6 | 44.2 | 44.6 |
| 13 | 43.2 | 45.3 | 44.9 | 47.1 | 45.3 |
| 14 | 44.2 | 45.7 | 45.0 | 47.7 | 45.7 |
| 15 | 43.8 | 44.8 | 45.0 | 47.9 | 45.4 |
| 16 | 43.5 | 45.0 | 45.7 | 47.0 | 45.3 |
| 17 | 43.8 | 46.0 | 44.5 | 45.6 | 45.0 |
| 18 | 42.9 | 45.6 | 44.9 | 46.6 | 45.0 |
| 19 | 43.9 | 45.5 | 44.1 | 46.6 | 45.0 |
| 20 | 42.8 | 46.0 | 44.5 | 48.2 | 45.4 |
| 21 | 43.8 | 45.0 | 44.8 | 48.3 | 45.5 |
| 22 | 43.1 | 44.9 | 45.4 | 48.3 | 45.7 |
| 23 | 43.5 | 46.8 | 45.0 | 47.2 | 45.6 |
| 24 | 43.4 | 45.7 | 45.2 | 46.0 | 45.1 |
| 25 | 42.8 | 44.5 | 45.6 | 47.5 | 45.1 |
| 26 | 42.7 | 45.5 | 45.0 | 45.0 | 45.6 |
| 27 | 43.7 | 45.7 | 45.0 | 47.7 | 45.5 |
| 28 | 44.0 | 45.0 | 45.0 | 48.2 | 45.6 |
| 29 | 42.5 | 45.5 | 45.4 | 48.0 | 45.7 |
| ACTUAL LEVEL | 43.8 | 46.3 | 44.3 | 46.6 | 45.3 |

Figure 5:
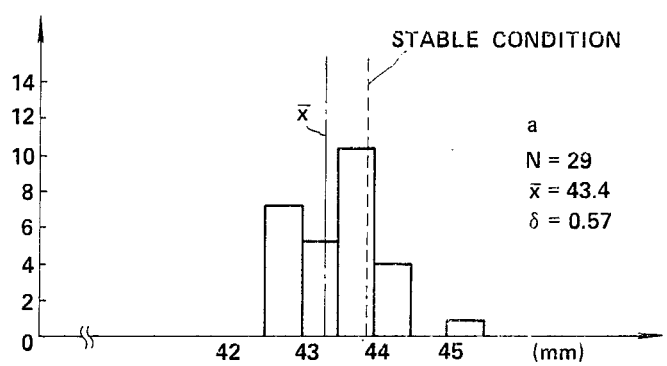
FIGS. 5 and 6 are hystograms of the result of liquid level detection performed in the conventional system.
Figure 6:
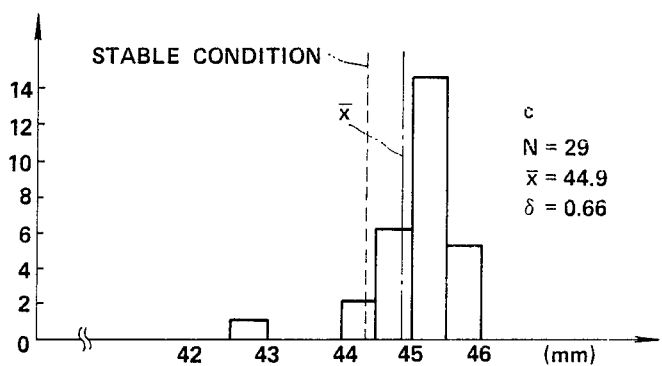
Figure 7:
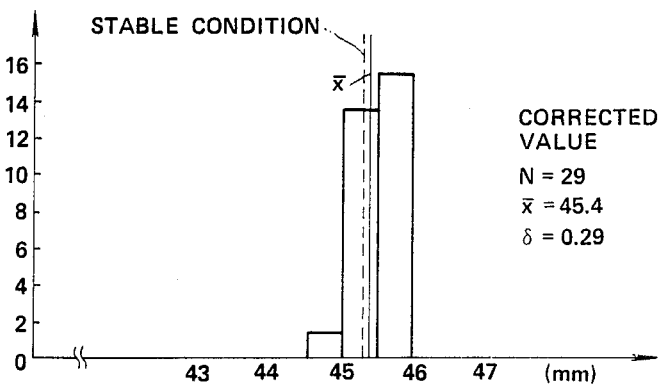
FIG. 7 is a hystogram of the result of liquid level detection performed by the modified embodiment of the liquid level detecting system of the invention.

As will be appreciated from the foregoing result of experimentation, the resultant average values $H_{ave}$ is satisfactorily close to that obtained while the liquid is stable. This result has been shown in a hystrogram in FIG. 7. This hystogram can be compared with a hystograms in FIGS. 5 and 6, which shows results of experimetations conducted by means of the conventional device as described in the aforementioned Japanese Patent First Publication No. 60-200216. FIGS. 5 through 7, $\bar{x}$ indicate overall average values of overall samples. As will be appreciated from these hystograms, substantially higher precision level in detecting level provided by the shown embodiment can be confirmed.

In the bottling process in a factory, this average value is taken as a liquid level indicative value. The derived average value is compared with a predetermined reference values representative of the standard liquid level. When the average value is out of a predetermined standard liquid level range, the signal processor 40 produces an error signal or an alarm.

Preferably, the signal processor 40 may be connected to a display 42 for graphically or numerically displaying the detected liquid level data. In the alternative, the signal processor 40 may be connected to a controller for a bottling system for removing the bottles containing the liquid in amount out of the predetermined standard amount range from the transporting conveyer.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. A method for detecting a liquid level in a bottle comprising the steps of:
   irradiating first light beam toward an area of liquid surface adjacent the peripheral bottle wall at a first side of the bottle from a position below said liquid surface and located at a second side of the bottle opposite to said first side;
   irradiating second light beam toward an area of liquid surface adjacent the peripheral bottle wall at said second side of the bottle from a position below said liquid surface and located at said first side of the bottle;
   receiving a first horizontally directed component of said first light beam reflected at the liquid surface and a second horizontally directed component of said first light beam refracted through said liquid, at said first side;
   producing a first light intensity indicative signal having higher values at signal positions corresponding to elevations, at which said first and second horizontally directed components of said first light beam are received;
   receiving a third horizontally directed component of said second light beam reflected at the liquid surface and a fourth horizontally directed component of said second light beam refracted through said liquid, at said second side;
   producing a second light intensity indicative signal having higher values at signal positions corresponding to elevations, at which said third and fourth horizontally directed components of said second light beam are received;
   processing said first and second intensity indicative signals for deriving average signal position to derive an average liquid level.

2. A method as set forth in claim 1, which further comprises the steps of:
   providing a first camera at said first side of said bottle for receiving said first and second horizontally directed components of said first light beam and for producing said first light intensity indicative signal, at a elevation corresponding to a predetermined standard liquid level;
   providing a second camera at said second side of said bottle for receiving said third and fourth horizontally directed components of said second light beam and for producing said second light intensity indicative signal, at an elevation corresponding to a predetermined standard liquid level; and
   focusing said first and second cameras at the positions on the bottle surface corresponding to said predetermined liquid level.

3. A method as set forth in claim 2, wherein said first and third horizontally directed components of said first and second light beams are reflected at circumferentially extending rising portion of said liquid surface in horizontal direction.

4. A method as set forth in claim 2, wherein said second and fourth horizontally directed components of said first and second light beams are twice refracted at the general surface of said liquid and at a surface of a circumferentially extending rising position to be directed horizontally.

5. A method as set forth in claim 2, wherein said average liquid level is derived by obtaining average signal position of the signal positions corresponding to the elevations of said first and third horizontally directed components of said first and second light beams.

6. A method as set forth in claim 2, wherein said average liquid level is derived by obtaining average signal position of the signal positions corresponding to the elevations of said second and fourth horizontally directed components of said first and second light beams.

7. A method as set forth in claim 2, wherein said average liquid level is derived by obtaining average signal position of the signal positions corresponding to the elevations of said first, second, third and fourth horizontally directed components of said first and second light beams.

8. A device for detecting a liquid level in a bottle comprising:
   first means for irradiating first light beam toward an area of liquid surface adjacent the peripheral bottle wall at a first side of the bottle from a position below said liquid surface and located at a second side of the bottle opposite to said first side;
   second means for irradiating second light beam toward an area of liquid surface adjacent the peripheral bottle wall at said second side of the bottle from a position below said liquid surface and located at said first side of the bottle;
   third means for receiving a first horizontally directed component of said first light beam reflected at the liquid surface and a second horizontally directed component of said first light beam refracted through said liquid, at said first side;
   fourth means for producing a first light intensity indicative signal having higher values at signal positions corresponding to elevations, at which said first and second horizontally directed components of said first light beam are received;
   fifth means for receiving a third horizontally directed component of said second light beam reflected at the liquid surface and a fourth horizontally directed component of said second light beam refracted through said liquid, at said second side;
   sixth means for producing a second light intensity indicative signal having higher values at signal positions corresponding to elevations, at which said third and fourth horizontally directed components of said second light beam are received; and
   seventh means for processing said first and second intensity indicative signals for deriving average signal position to derive an average liquid level.

9. A device as set forth in claim 8, which further comprises eighth means for providing a first camera at said first side of said bottle for receiving said first and second horizontally directed components of said first light beam and for producing said first light intensity indicative signal, at an elevation corresponding to a predetermined standard liquid level, ninth means for providing a second camera at said second side of said bottle for receiving said third and fourth horizontally directed components of said second light beam and for producing said second light intensity indicative signal, at an elevation corresponding to a predetermined standard liquid level, and tenth means for focusing said first and second cameras at the positions bottle surface corresponding to said predetermined liquid level.

10. A device as set forth in claim 9, wherein said first and third horizontally directed components of said first and second light beams are reflected at circumferentially extending rising portion of said liquid surface in horizontal direction.

11. A device as set forth in claim 9, wherein said second and fourth horizontally directed components of said first and second light beams are twice refracted at the general surface of said liquid and at a surface of a circumferentially extending rising position to be directed horizontally.

12. A device as set forth in claim 9, wherein said seventh means derives said average liquid level obtaining average signal position of the signal positions corresponding to the elevations of said first and third horizontally directed components of said first and second light beams.

13. A device as set forth in claim 9, wherein said seventh means derives said average liquid level by obtaining average signal position of the signal positions corresponding to the elevations of said second and fourth horizontally directed components of said first and second light beams.

14. A device as set forth in claim 9, wherein said seventh means derives average liquid level obtaining average signal position of the signal positions corresponding to the elevations of said first, second, third and fourth horizontally directed components of said first and second light beams.

* * * * *